United States Patent
Wu et al.

(10) Patent No.: US 10,575,000 B2
(45) Date of Patent: Feb. 25, 2020

(54) METHOD AND APPARATUS FOR IMAGE COMPRESSION USING BLOCK PREDICTION MODE

(71) Applicant: MEDIATEK INC., Hsin-Chu (TW)

(72) Inventors: Tung-Hsing Wu, Chiayi (TW); Li-Heng Chen, Tainan (TW); Han-Liang Chou, Baoshan Township, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 362 days.

(21) Appl. No.: 15/485,283

(22) Filed: Apr. 12, 2017

(65) Prior Publication Data

US 2017/0310987 A1    Oct. 26, 2017

Related U.S. Application Data

(60) Provisional application No. 62/324,987, filed on Apr. 20, 2016.

(51) Int. Cl.
*H04N 19/176* (2014.01)
*H04N 19/124* (2014.01)
(Continued)

(52) U.S. Cl.
CPC ......... *H04N 19/176* (2014.11); *H04N 19/105* (2014.11); *H04N 19/124* (2014.11);
(Continued)

(58) Field of Classification Search
CPC .. H04N 19/176; H04N 19/593; H04N 19/147; H04N 19/51; H04N 19/105; H04N 19/124
See application file for complete search history.

(56) References Cited

U.S. PATENT DOCUMENTS

| 9,058,659 B2 | 6/2015 | Yie et al. |
| 9,883,180 B2 | 1/2018 | MacInnis et al. |

(Continued)

FOREIGN PATENT DOCUMENTS

| CN | 102648631 A | 8/2012 |
| CN | 103188494 A | 7/2013 |
| CN | 104704828 A | 6/2015 |

*Primary Examiner* — Joseph W Becker
(74) *Attorney, Agent, or Firm* — McClure, Qualey & Rodack, LLP

(57) ABSTRACT

A method and apparatus of image coding performed at an encoder or decoder using block prediction are disclosed. The block vector bit-count information associated with one or more block vectors (BVs) for the current block is determined, where the BVs are used to locate one or more block predictors for the current block. Prediction residuals corresponding to differences between the current block and the block predictors are determined. A first cost comprising the BV and residual bit-count information associated with encoding the prediction residuals using the first coding tool is determined. The second cost comprising the BV bit-count information and without the residual bit-count information is also determined. The derivation of the BV bit-count information and the prediction residuals for the current block are performed only once, and the BV bit-count information and the prediction residuals are used by the first coding tool and the second coding tool.

12 Claims, 10 Drawing Sheets

(51) Int. Cl.
*H04N 19/105* (2014.01)
*H04N 19/593* (2014.01)
*H04N 19/147* (2014.01)
*H04N 19/51* (2014.01)

(52) U.S. Cl.
CPC ........... *H04N 19/147* (2014.11); *H04N 19/51* (2014.11); *H04N 19/593* (2014.11)

(56) References Cited

U.S. PATENT DOCUMENTS

| | | | |
|---|---|---|---|
| 2012/0008676 A1* | 1/2012 | Lee | H04N 19/137 375/240.02 |
| 2013/0170761 A1 | 7/2013 | Wey et al. | |
| 2015/0304675 A1 | 10/2015 | Jacobson et al. | |

* cited by examiner

*Related Art*

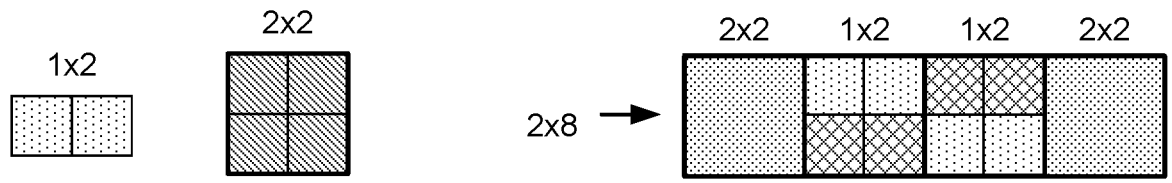
Fig. 3A    Fig. 3B
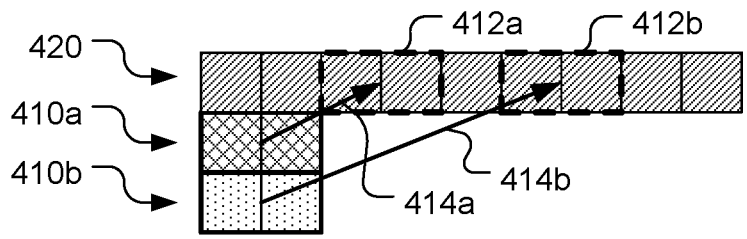
Fig. 4A
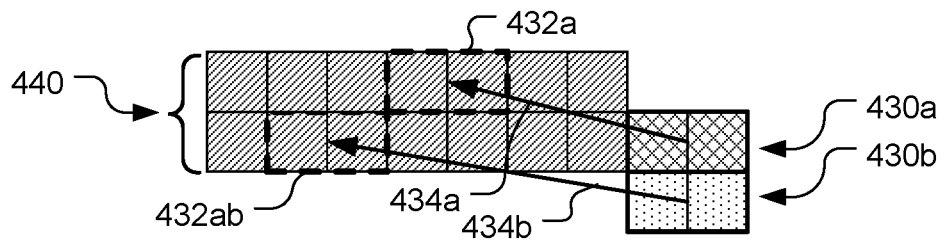
Fig. 4B
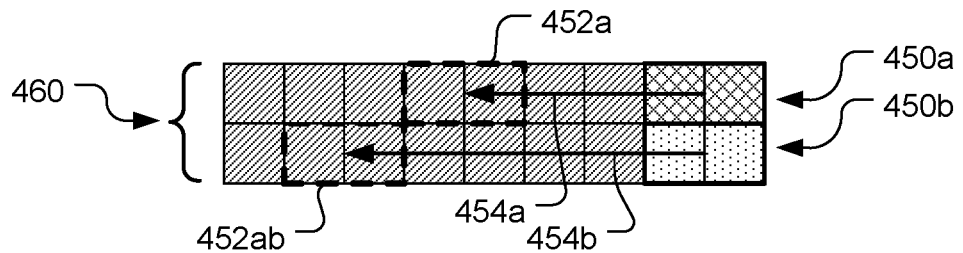
Fig. 4C

METHOD AND APPARATUS FOR IMAGE COMPRESSION USING BLOCK PREDICTION MODE

CROSS REFERENCE TO RELATED APPLICATIONS

The present invention claims priority to U.S. Provisional Patent Application, Ser. No. 62/324,987, filed on Apr. 20, 2016. The U.S. Provisional patent application is hereby incorporated by reference in its entirety.

FIELD OF THE INVENTION

The present invention relates to image coding using block prediction. In particular, the present invention relates to method and apparatus for encoding or decoding images using block prediction.

BACKGROUND AND RELATED ART

Various video coding standards have been developed to reduce the required bitrate for video transmission or the required capacity for storage. For example, MPEG-2, MPEG-4 and AVC/H.264 have been widely used in various applications. In recent years, the coding efficiency has been substantially improved in newer video compression formats such as VP8, VP9 and the emerging HEVC (High Efficiency Video Coding) standards.

In various devices that involve image display, there is another type of application that requires data compression. In particular, display links connecting computers to monitors, set-top boxes to televisions, and application processors to display panels are digital interface formats widely used in the industry. Display links use digital interfaces. With the increasing demand for higher display resolutions and higher frame rates, the amount of data sent over display links becomes extremely high. For example, the display link between a set-box device and a 1080p HDTV at 120 Hz frame rate will require more than 7 Gbits/sec. For UHD (Ultra High Definition) TV, the required data will be four-fold higher. Therefore, display links are often in compressed formats. For example, DSC (Display Stream Compression) standard has been developed jointly by VESA (Video Electronics Standards Association) and MIPI Alliance to address the needs for data compression in display applications.

Due to different requirements, the DSC standard is different from popular video coding standards, such as MPEG-2/4, AVC/H.264 and HEVC. For example, the color space used for compression in display applications may be the YCoCg color space, instead of the YUV color space. Furthermore, DSC only includes Intra-frame compression without Inter-frame compression to minimize the processing delay and avoid the need for reference picture buffer. In typical applications, the compression ratios required for DSC is much smaller those for video storage or network delivery. FIG. 1A illustrates major functional blocks of an exemplary DSC encoder. As shown in FIG. 1A, the DSC encoder includes a source buffer 110, a predictor/quantization/reconstruction unit 112, a VLC entropy coding unit 114, a flatness determination unit 116, a rate control unit 118, a line buffer 120, and an indexed color history (ICH) unit 122. If the input image data are in the RGB color format, a color-space converter (not shown in FIG. 1A) corresponds to a RGB-to-YCoCg color format converter is utilized in the DSC encoder. The information from the flatness determination unit 116 can be used to adjust the QP (quantization parameter) in the rate control unit 118. As shown in FIG. 1A, the flatness indication is entropy coded using the VLC entropy coding unit 114 and incorporated in the bitstream. According to DSC, the pixels are processed using a 1×3 block size as shown on FIG. 1B, where a current block 130 is predicted by a reference block 132 in the same pixel line. The location of the reference block 132 is indicated by a corresponding block vector 134.

Upon the growing needs for display links to support higher display resolutions and higher bit depth for color components, VESA initiated development efforts to establish a standard for Advanced Display Stream Compression (ADSC). Also, the ADSC supports native 4:2:0 and 4:2:2 coding to eliminate the need for converting pixels into RGB components. For example, ADSC allows more efficient compression in YCbCr 4:2:0 color sampling format. In addition, ADSC also supports High Dynamic Range (HDR) to accommodate the higher color depth in newer TV shows and movies.

The processing for display links often uses block-based compression, where an image is divided into blocks and the compression is applied to each block. Furthermore, the compression settings may be applied to an image unit smaller than an image. For example, Advanced DSC (ADSC) being developed is applied to slices of each image and the target bitrate is imposed on each slice. Each slice is divided into coding units (i.e., blocks) and each coding unit consists of a block of N×M pixels, where N corresponds to block height and M corresponds to block width. According to ADSC, the characteristics of each block are evaluated in terms of "flatness", where the flatness of each block is categorized into five flatness types as follows:

Type: −1 denotes the "complex block"
Type: 0 denotes the "flat region"
Type: 1 denotes the "flat region (less flat than type 1)"
Type: 2 denotes the "complex to flat block"
Type: 3 denotes the "flat to complex block"

The flatness type is determined according to the complexity information of each block and its neighboring blocks. Flatness type influences the rate control behavior in each block. According to the existing ADSC draft standard, the syntax of flatness type is signaled in each coding unit.

It is desirable to further improve the compression efficiency of the ADSC. In particular, the present invention addresses performance improvement for the block prediction mode.

BRIEF SUMMARY OF THE INVENTION

A method and apparatus of image coding for an image to be performed at an encoder are disclosed, where the encoder uses multiple coding tools including at least a first coding tool and a second coding tool associated with block prediction. The block vector bit-count information related to compressed block vector bits associated with one or more block vectors for the current block is determined, where the block vectors are derived according to block prediction to locate one or more block predictors for the current block. Prediction residuals corresponding to differences between the current block and the block predictors are determined. A first cost associated with the first coding tool is determined, where the first cost comprises the block vector bit-count information and residual bit-count information associated with encoding the prediction residuals using the first coding tool. The second cost associated with the second coding tool is also determined, where the second cost comprises the block vector bit-count information and without the residual bit-count information. The current block is then encoded using a current coding tool to generate a bitstream including compressed bits of the current block, where the current coding tool is selected from a coding tool group comprising the first coding tool and the second coding tool based on associated costs for the coding tool group including the first cost and the second cost. In one embodiment, the derivation of the block vector bit-count information and the prediction residuals for the current block are performed only once, and the block vector bit-count information and the prediction residuals are used by the first coding tool and the second coding tool.

The block predictors for the current block can be derived from previously reconstructed pixels in the current slice or the current image according to location of the current block and said one or more block vectors. The encoding the prediction residuals using the first coding tool comprises quantizing the prediction residuals into quantized prediction residuals and further encoding the quantized prediction residuals into compressed residual bits, and wherein the residual bit-count information is related to the compressed residual bits. The first cost further comprises first distortion information corresponding to first distortion between the current block and a first reconstructed block using the first coding tool. The first distortion can be derived from quantization error associated with said quantizing the prediction residuals. When the first coding tool is applied to the current block, the compressed bits of the current block comprise compressed block vector bits and the compressed residual bits for the current block.

On the other hand, the second cost further comprises second distortion information corresponding to second distortion between the current block and a second reconstructed block using the second coding tool. The second distortion corresponds to an absolute sum or total energy of the prediction residuals. When the second coding tool is applied to the current block, the compressed bits of the current block comprise compressed block vector bits without compressed residual bits for the current block.

In one embodiment, the current block corresponding to a 2×8 block is partitioned into 2×2 blocks. Each 2×2 block can be coded as a single 2×2 block according to 2×2 partition. Each 2×2 block can also be coded as two 1×2 blocks according to 1×2 partition. A method of present invention comprises selecting a partition type between the 2×2 partition and the 1×2 partition for encoding the current block using the first coding tool or the second coding tool. In this case, the first cost associated with the first coding tool and the second cost associated with the second coding tool are determined for the current block with the 2×2 partition and the 1×2 partition, and one first partition type with a lower first cost is selected for the first coding tool and one second partition type with a lower second cost is selected for the second coding tool. For the 1×2 partition, one block vector is determined for each 1×2 block of the 2×2 block to locate one 1×2 predictor from previously reconstructed pixels in the current slice or the current image. For the 2×2 partition, one block vector is determined for each 2×2 block to locate one 2×2 predictor from the previously reconstructed pixels in the current slice or the current image. The prediction residuals for the 2×2 partition correspond to first differences between the 2×2 blocks and corresponding 2×2 predictors, and the prediction residuals for the 1×2 partition correspond to second differences between two 1×2 blocks of one 2×2 block and corresponding two 1×2 predictors. The second cost may correspond to an absolute sum or total energy of the prediction residuals.

A method and apparatus of image decoding for an image to be performed at a decoder are disclosed, where the decoder uses multiple coding tools including at least a first coding tool and a second coding tool associated with block prediction. When the first coding tool is used, one or more first block vectors for the current block are derived from the bitstream according to first entropy decoding, where the first block vectors are used to locate one or more first block predictors for the current block; decoded prediction residuals for prediction residuals are also derived from the bitstream, where the prediction residuals correspond to differences between the current block and said one or more first block predictors; and the current block is reconstructed based on the decoded prediction residuals and the first block predictors for the current block according to first block-prediction reconstruction. When the second coding tool is used, one or more second block vectors for the current block are derived from the bitstream according to second entropy decoding, wherein said one or more second block vectors are used to locate one or more second block predictors for the current block; and the current block is reconstructed based on the second block predictors for the current block according to second block-prediction reconstruction. According to the present invention for the decoder, the first entropy decoding and the second entropy decoding share a same entropy decoder, the first block-prediction reconstruction and the second block-prediction reconstruction share a same block-prediction reconstruction unit to reconstruct one reconstructed block from one or more predictors and decoded prediction residuals, or both.

In the decoder side, when the first coding tool is used, deriving the decoded prediction residuals comprises deriving quantized prediction residuals for the current block from the bitstream, and deriving the decoded prediction residuals further comprises applying inverse quantization to the quantized prediction residuals to recover the decoded prediction residuals. When the first block-prediction reconstruction and the second block-prediction reconstruction share the same block-prediction reconstruction unit, the decoded prediction residuals are set to zero for the second block-prediction reconstruction. When the second coding tool is used, said one or more predictors are used as reconstructed current block.

In one embodiment of the present invention for the decoder side, the current block corresponding to a 2×8 block is partitioned into 2×2 blocks. Each 2×2 block is coded as one single 2×2 block according to 2×2 partition or two 1×2 blocks according to 1×2 partition based on a partition type derived from the bitstream. For the 2×2 partition, one 2×2 predictor is determined from previously reconstructed pixels in the current slice or the current image according to the location of the current 2×2 block and one block vector for the current 2×2 block derived from the bitstream. For the 1×2 partition, one 1×2 predictor is derived from previously reconstructed pixels in the current slice or the current image according to the location of each 1×2 block of the current 2×2 block and one block vector for each 1×2 block of the current 2×2 block.

BRIEF DESCRIPTION OF THE DRAWINGS

FIG. 3A illustrates an example of allowed variable block sizes (i.e., 2×2 and 1×2) for the block prediction mode according to Advanced Display Stream Compression (ADSC) v0.3.

FIG. 3B illustrates an example of an image area consisting of 2×8 pixels, which is divided into four 2×2 blocks. For each 2×2 block, the block can be either coded as one 2×2 block or two 1×2 partitions.

FIG. 4A illustrates an example of block prediction for the 1×2 partition mode for a 2×2 block located at non-first line location of a slice or image according to the conventional Advanced Display Stream Compression (ADSC), where both 1×2 blocks of the 2×2 block derive predictors from the same previous line.

FIG. 4B illustrates another example of block prediction for the 1×2 partition mode for a 2×2 block located at non-first line location of a slice or image according to the conventional ADSC, where two 1×2 blocks of the 2×2 block derive predictors from two different lines in the previously reconstructed area.

FIG. 4C illustrates yet another example of block prediction for the 1×2 partition mode according to the conventional ADSC for a block in the first line location and non-first line location of the slice or image.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In most image and video coding systems, the source pixels are processed to remove or reduce redundancy so that the processed source pixels are more suited for efficient transmission or storage. For example, the source pixels may be subject to prediction process, transform process or a combination to generate prediction residuals or transform coefficients. A quantization process may also be further applied to the prediction residuals or transform coefficients to reduced required data representation. The processing will generate a set of processed data, such as quantized residuals or quantized transform coefficients. The set of processed data along with related coding information and parameters, such as the coding mode for a block of pixels, are coded into final bitstream using entropy coding to exploit the statistical redundancy within the processed data, coding information and parameters. The processed data, coding information and parameters to be coded into the bitstream are often referred as symbols.

Figure 1A:
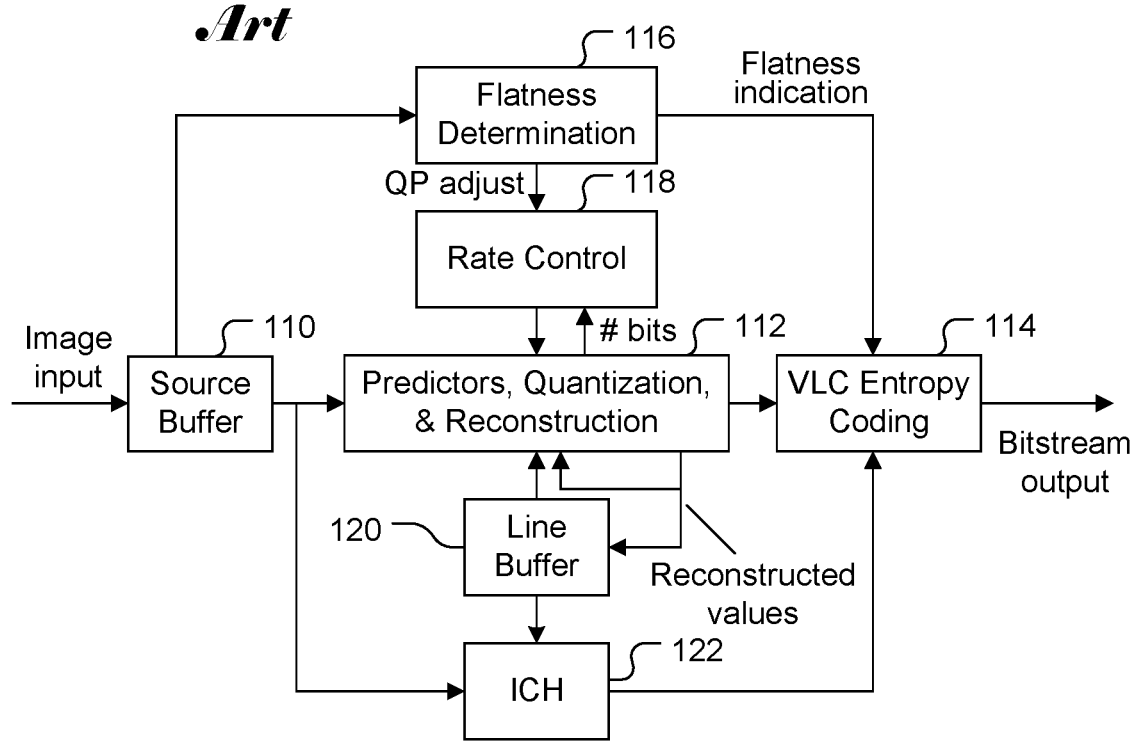
FIG. 1A illustrates major functional blocks of an exemplary system based on the Display Stream Compression (DSC) standard.
Figure 1B:
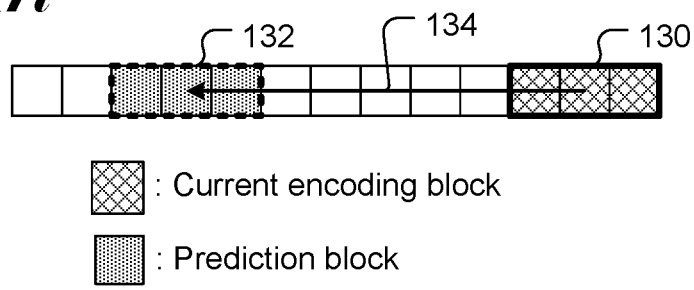
FIG. 1B illustrates an example of block prediction according to the Display Stream Compression (DSC) standard.
Figure 2A:
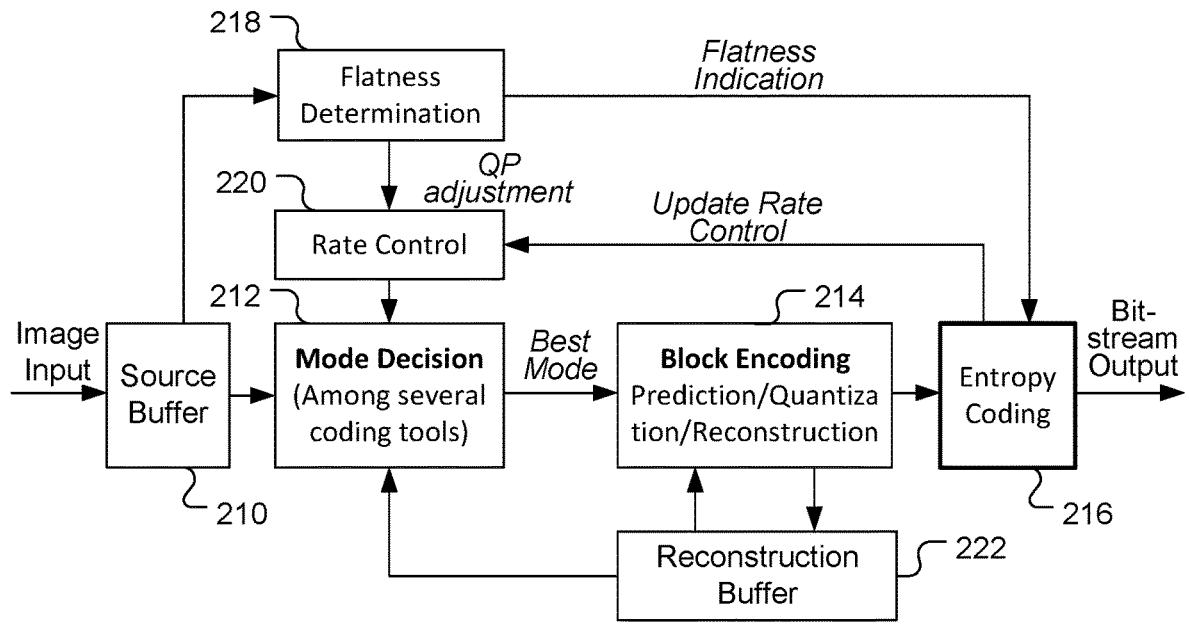
FIG. 2A illustrates major functional blocks of an exemplary system based on the Advanced Display Stream Compression (ADSC) draft.

FIG. 2A illustrates major functional blocks of an exemplary coding system according to the ADSC draft. The ADSC encoder includes a source buffer 210, a mode decision unit 212 to select a best mode for a current block being coded, a block encoding unit 214 to apply predictor, quantization and reconstruction to the current block using the best mode selected by the mode decision unit 212, a VLC entropy coding unit 216, a flatness determination unit 218, a rate control unit 220 and a reconstruction buffer 222. The reconstructed data buffered in the reconstruction buffer 222 will be used as reference data for encoding a current block and/or subsequent blocks. The reconstructed data buffered in the reconstruction buffer 222 will also be used in mode decision.

According to ADSC, various coding modes are used for coding the blocks. The coding modes include Transform mode, DPCM mode, BP (block prediction) mode, Pattern mode, MPP (midpoint prediction) mode, and MPPF (MPP fallback) mode. Midpoint Prediction (MPP) mode uses a midpoint value as the predictor in each block. For example, the midpoint value can be determined by half of dynamic range of the pixels or mean value of the neighboring reconstructed pixels of the current block.

Figure 2B:
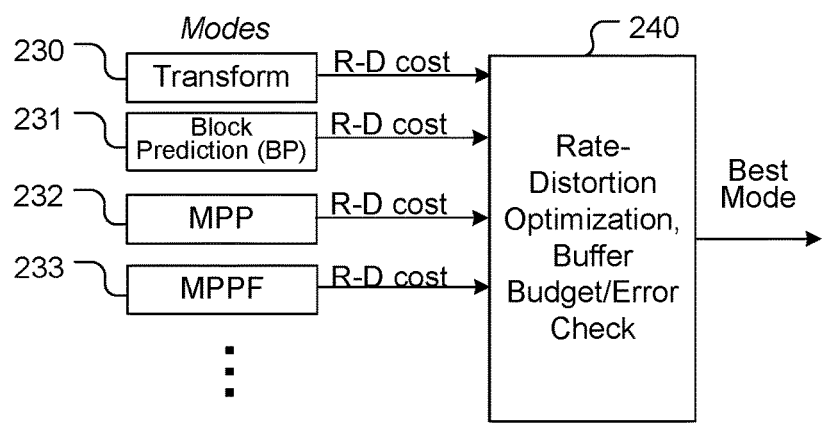
FIG. 2B illustrates mode decision process according to the Advanced Display Stream Compression (ADSC) draft.

FIG. 2B illustrates an exemplary mode decision process according to ADSC draft. The types of modes include Transform mode 230, Block Prediction (BP) mode 231, MPP mode 232, MPPF mode 233 and others. For each mode, the R-D cost (rate-distortion cost) is calculated and provided to a respective processing unit (240) to perform the rate-distortion optimization, buffer budget and error check function. The processing unit 240 inspects the buffer budget for each available mode. Part of modes can be turned off by encoder/decoder configuration, and the configuration can be signaled in high level syntax such as picture parameter set (PPS). The present invention may use similar processing flow as shown in FIG. 2A and FIG. 2B. However, the mode decision unit 212, the block encoding unit 214 and the entropy coding unit 216 may incorporate embodiments of the present invention.

For image compression, a prediction process is often used to improve the coding efficiency. For example, in the draft ADSC coding standard, various prediction modes, such as Block Prediction mode, Transform mode and DPCM mode, are used. The prediction processes take advantage of correlation or statistics of source data to generate prediction residues, which can be compressed more efficiently. In most image and video coding systems, an image is divided into blocks and the coding process is applied to individual blocks. Usually, variable block size is allowed in most image and video compression systems. In Advanced Display Stream Compression (ADSC), the block size for the block prediction mode also can be variable block size. For example, the block size of block prediction mode in ADSC v0.3 can be either 1×2 or 2×2 as shown in FIG. 3A. The block size can be determined adaptively for each 2×2 block. For example, FIG. 3B illustrates an example of an image area consisting of 2×8 pixels, which is divided into four 2×2 blocks. For each 2×2 block, the block can be either coded as one 2×2 block or two 1×2 partitions as shown in FIG. 3B.

For ADSC block prediction (BP) mode, each image is partitioned into one or more slices and each slice is partitioned into 2×8 blocks. Each block can be coded using either the 2×2 or 1×2 block prediction mode (i.e., 2×2 partition or 1×2 partition). FIG. 4A illustrates an example of block prediction for the 1×2 partition for a 2×2 block located at a non-first line location of a slice or image according to the conventional ADSC. Blocks 410a and 410b represent two 1×2 blocks of the current 2×2 block being processed and pixel line 420 filled with slant-lines represents reconstructed pixels prior to the blocks being processed. Blocks 412a and 412b correspond to two 1×2 predictors for blocks 410a and 410b of the current block respectively. Block vectors 414a and 414b represent the block vectors pointing from block 410a to the predictor 412a and from block 410b to predictor 412b respectively.

FIG. 4B illustrates another example of block prediction for the current block in a non-first line location of the slice or image using the 1×2 partition mode according to the conventional ADSC, where area 440 filled with slant-lines represents previously reconstructed pixels from two lines prior to the blocks being processed. Blocks 430a and 430b represent two 1×2 blocks of the current 2×2 block being processed. Blocks 432a and 432b correspond to two predictors for the current block 430a and 430b respectively. Block vectors 434a and 434b represent the block vectors pointing from the current block 430a to the predictor 432a and from the current block 430b to the predictor 432b respectively.

FIG. 4C illustrates yet another example of block prediction for the current block in the first line location of the slice or image using the 1×2 partition mode according to the conventional ADSC, where area 460 filled with slant-lines represents previously reconstructed pixels from two lines in the same block row as the block being processed. Blocks 450a and 450b represent two 1×2 blocks of the current 2×2 block being processed. Blocks 452a and 452b correspond to two predictors for the current block 450a and 450b respectively. Block vectors 454a and 454b represent the block vectors pointing from the current block 450a to the predictor 452a and from the current block 450b to the predictor 452b respectively.

Figure 5A:
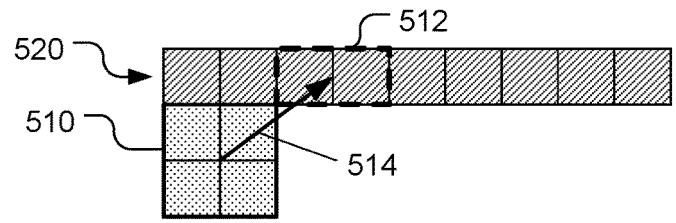
FIG. 5A illustrates an example of block prediction for the 2×2 partition mode for a 2×2 block at a non-first line location of a slice or image according to the conventional ADSC, where both the upper and lower 1×2 blocks of the 2×2 block derive predictors from a single 1×2 block in a previous line.

FIG. 5A illustrates an example of block prediction for the 2×2 block prediction mode (i.e., 2×2 partition mode) at a non-first line location of a slice or image according to the conventional ADSC, where the predictor is from a same previously reconstructed line. Block 510 represents a 2×2 block being processed and pixel line 520 filled with slant-lines represents one reconstructed pixel line prior to the block 510. Block 512 corresponds to the predictor for the current block 510. In this case, the predictor size is 1×2 while the current block size is 2×2. Both the upper and lower 1×2 blocks of the current 2×2 block is predicted by the same 1×2 predictor. Equivalently, the predictor can be considered as a 2×2 block with the 1×2 predictor 512 in the upper half and lower half. Block vector 514 represents the block vector pointing from the current block 510 to the predictor 512.

Figure 5B:
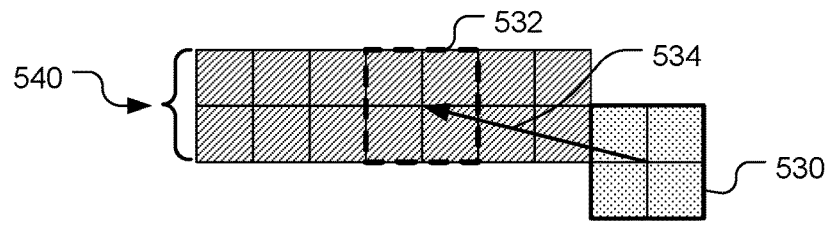
FIG. 5B illustrates another example of block prediction for the 2×2 partition mode for a 2×2 block at a non-first line location of a slice or image according to the conventional ADSC, where the 2×2 block derives a 2×2 predictor from previously reconstructed pixels.

FIG. 5B illustrates another example of block prediction for the 2×2 block prediction mode at a non-first line location of a slice or image according to the conventional ADSC, where the previously reconstructed pixels are from two consecutive lines. Block 530 corresponds to a current 2×2 block being processed. Pixel lines 540 filled with slant-lines represent two reconstructed pixel lines prior to the block 530. Block 532 corresponds to the 2×2 predictor for the current block. Block vector 534 represents the block vector pointing from the current block 530 to the predictor 532.

Figure 5C:
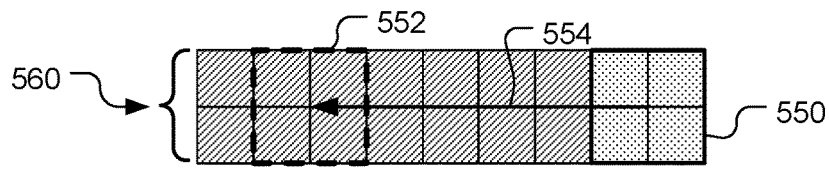
FIG. 5C illustrates yet another example of block prediction for the 2×2 partition mode for a block at the first line location and non-first line location of a slice or image according to the conventional ADSC, the 2×2 predictor is in the same block row as the current block.

FIG. 5C illustrates yet another example of block prediction for the 2×2 block prediction mode at the first-line location of a slice or image according to the conventional ADSC, where the predictor is derived from previously reconstructed pixels in the same block row of the current block. Block 550 corresponds to a current 2×2 block being processed. Pixel lines 560 filled with slant-lines represent two reconstructed pixel lines prior to the block 550. Block 552 corresponds to the 2×2 predictor for the current block. Block vector 554 represents the block vector pointing from the current block 550 to the predictor 552.

Figure 5D:
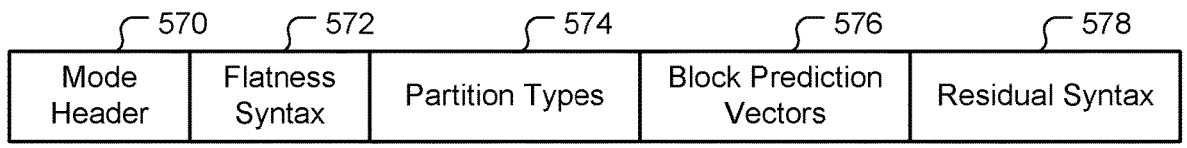
FIG. 5D illustrates the bitstream syntax of BP mode according to the draft ADSC standard.

FIG. 5D illustrates the bitstream syntax of BP mode according to the draft ADSC standard. The bitstream syntax comprises Mode Header field 570, Flatness Syntax field 572, Prediction Types 574, Block Prediction Vectors field 576 and Residual Syntax field 578. The Mode header field 570 is used to signal the prediction mode selected for a current coding unit. If the BP mode is selected, the Mode Header field 570 will indicate such selection. As shown in FIG. 2A, the flatness is determined for each coding unit and the flatness indication is entropy coded using Entropy Coding 216. The coded flatness information is then included in the Flatness Syntax field 572. The Prediction Types 574 indicate whether 2×2 partition or 1×2 partition is used. The Block Prediction Vectors field 576 is used to signal the motion vector(s) for the current coding unit to locate the corresponding predictors. As mentioned before, when prediction is used, the prediction residues are always transmitted according to the draft ADSC standard. The Residual Syntax field 578 is used to signal the required prediction residues.

For the Block Prediction mode, a current block may use motion information from neighboring blocks to predict the current motion information. If there is a good match, the current block can inherit its motion information from a previously coded neighboring block. Therefore, the current motion information can be derived by identifying the neighboring block from a list. Furthermore, if the prediction residues are small or the prediction residues meet a certain criterion, the signaling of the prediction residues can be skipped. In other words, the prediction residues are treated as zero. This no-residue Block Prediction mode is referred as BP-Skip mode. At the decoder side, when this no-residue prediction mode is detected, all-zero residues are used to reconstruct the signal according to the prediction process. While the zero value can be used for the residues, other pre-defined values may also be used. Since the use of no-residue prediction mode will skip the processing for encoding the prediction residues into the bitstream or decoding coded prediction residues to reconstruct a current block, the no-residue prediction mode may also be used when the encoder does not have adequate computation resources or when the encoder estimates high processing at the decoder side.

Figure 5E:
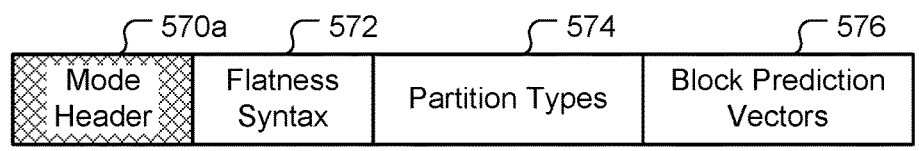
FIG. 5E illustrates the bitstream syntax of BP-Skip mode according to the draft ADSC standard.

FIG. 5E illustrates exemplary bitstream syntax of no-residue BP mode (i.e., BP-Skip mode). The Mode Header field 570a will indicate a no-residue prediction mode. For example, if block prediction is used for the current coding unit, the Mode Header field 570a will indicates no-residue BP mode. In this case, the flatness information, partition type and the block vectors will be signaled in the Flatness Syntax field 572, Partition Type field 574 and Block Prediction Vectors field 574 respectively as disclosed in the draft ADSC standard. However, the new bitstream syntax does not include Residual Syntax field 578 since there is no prediction residue to be signaled according to the present invention.

Figure 6A:
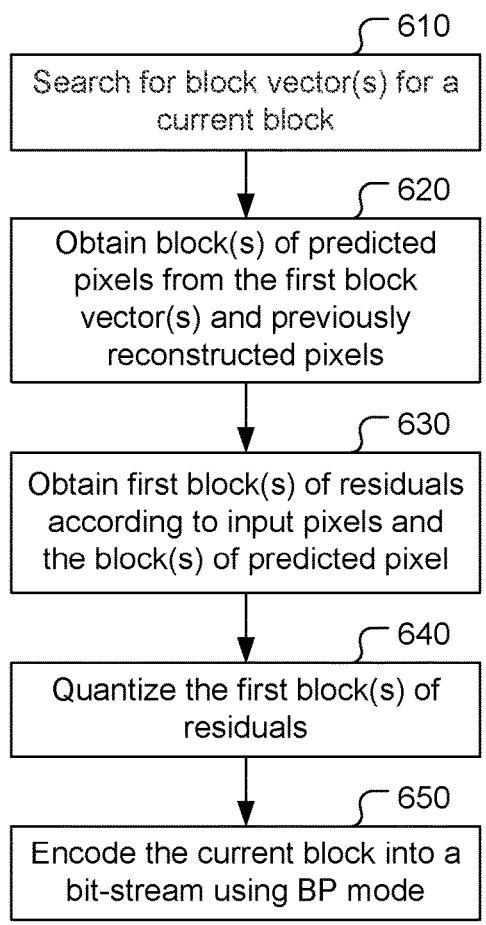
FIG. 6A illustrates an example of the block prediction process according to the draft ADSC standard.

FIG. 6A illustrates an exemplary flowchart for Block Prediction processing performed at an encoder side. In step 610, block vector search is performed to find best block vector(s) (referred as the first block vector(s) in FIG. 6A) for a current block. Block(s) of predicted pixels is derived from the first block vector and previously reconstructed pixels as shown in step 620. Block(s) of residuals (referred as first block(s) of residuals in FIG. 6A) is derived according to the input pixels and the block(s) of predicted pixels in step 630. In step 640, the block(s) of residuals is quantized. In step 650, the current block is encoded into a bitstream using BP mode. As shown in FIG. 5C, the bitstream for the block includes mode header, flatness syntax, block predictor vectors and residuals syntax. For the BP mode, the residual is derived as the difference between the source pixel and the predicted pixel. On the other hand, the reconstructed block is derived as the sum of predictor and the quantized (Q)-inverse quantized (IQ) residuals. The distortion is calculated as the difference between the source pixel and the reconstructed pixel, i.e., BP mode distortion=source pixel−(predicted pixel+Q-IQ residual pixel).

Figure 6B:
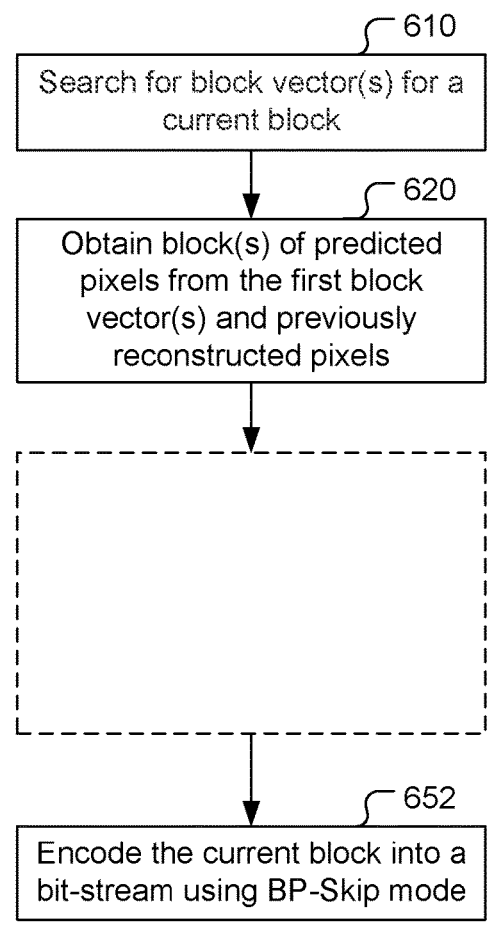
FIG. 6B illustrates an example of the BP-Skip process according to the draft ADSC standard.

FIG. 6B illustrates an exemplary flowchart for BP-Skip mode processing performed at an encoder side. After steps 610 and 620, there is no need for steps 630 and 640 for the BP-Skip mode since the residuals are not signaled. In step 652, the current block is encoded into a bitstream using BP-Skip mode. As shown in FIG. 5D, the bitstream for the block includes mode header, flatness syntax and block predictor vectors. However, the residuals syntax is not needed in this mode. For the BP-Skip mode, the reconstructed block is the same as the predictor. Therefore, the distortion corresponds to the residual.

As shown in FIG. 6A and FIG. 6B, the encoder processing for the BP mode and the BP-Skip mode according to a conventional approach is different. However, the processing for the BP-Skip mode is a subset of the processing for the BP mode.

As observed from FIG. 6A and FIG. 6B, the BP process and the BP-Skip process share some common processing blocks such as the block vector(s) derivation in step 610 and the predictor derivation using the block vector(s) in step 620. Accordingly, the present invention discloses an efficient implementation of an image coding system that includes the BP mode and BP-Skip mode, where some processing blocks are shared between the BP mode and the BP-Skip mode. For example, the block vector(s) derivation and the predictor derivation using the block vector(s) can be shared between the BP mode and the BP-Skip mode.

Figure 7:
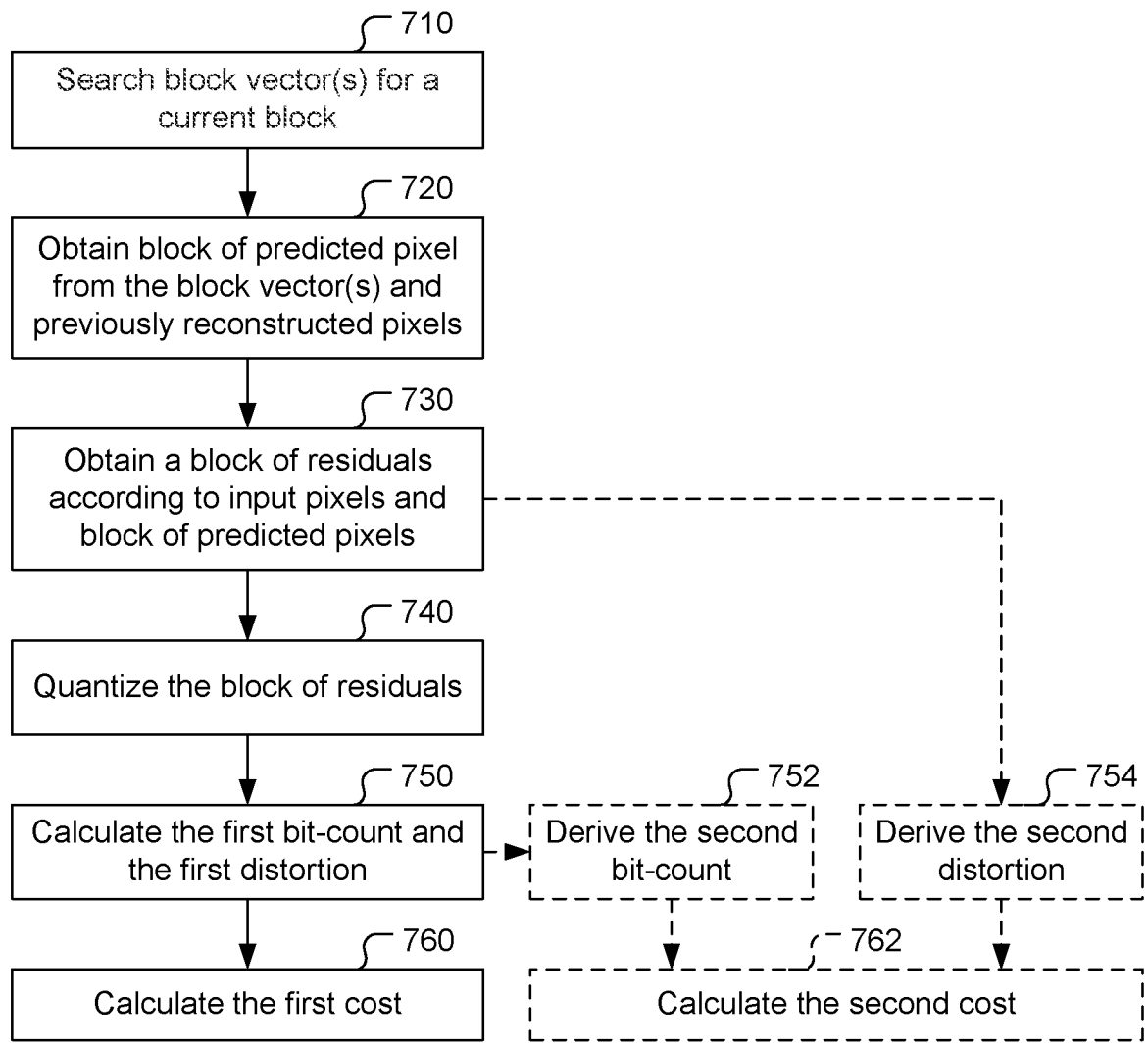
FIG. 7 illustrates an example of an image coding system using coding tools including a BP mode and a BP-Skip mode according to an embodiment of the present invention, where some processing blocks are shared between the BP mode and the BP-Skip mode.

FIG. 7 illustrates an example of an image coding system using coding tools including a BP mode and a BP-Skip mode according to an embodiment of the present invention, where some processing blocks are shared between the BP mode and the BP-Skip mode. In FIG. 7, the processing steps 710, 720 and 730 are shared by the BP coding tool and the BP-Skip coding tool since these steps are required by both the BP mode and the BP-Skip mode. In step 710, one or more block vectors are searched for the current block. As is known for ADSC, a block may be partitioned into smaller blocks and multiple block vectors will be searched for the multiple smaller blocks. The one or more block vectors derived can be used to locate one or more predictors in the previously reconstructed area in the current slice or image as shown in step 720. As is known for ADSC, a block can be partitioned into smaller blocks and a predictor is derived for each smaller block. The prediction residuals are formed between the input pixels and the predicted pixels as shown in step 730. After the prediction residuals are derived, the prediction residuals are processed differently according to the BP mode and the BP-Skip mode. When the BP mode coding tool is used, the prediction residuals are coded and signaled in the bitstream by quantizing the prediction residuals into quantized prediction residuals in step 740. The quantized prediction residuals are then encoded into compressed bits. In order for the encoder to select between the BP mode and the BP-Skip mode, the costs for using the BP coding tool and the BP-Skip coding tool are evaluated and compared. In the field of data compression, the rate-distortion cost is often used as a cost criterion for selecting a coding mode. Accordingly, the rate and distortion associated with each coding tool are evaluated. The rate is evaluated in terms of required bit count for a block. For the BP mode, the associated rate (referred as first bit-count in step 750) and distortion (referred as first distortion in step 750) are calculated in step 750. The first cost associated with the BP coding tool is then calculated in step 760. For the BP-Skip mode, the associated rate (referred as second bit-count) is derived in step 752 and distortion (referred as second distortion) is derived in step 754. The second cost associated with the BP-Skip coding tool is then calculated in step 762.

For the BP mode, the coded prediction residuals are also signaled as shown in the FIG. 5C. The prediction residuals are quantized into quantized prediction residuals according to a quantization step. The quantized prediction residuals are then coded into compressed bits to be signaled as residual syntax in the bitstream. The first bit-count associated with the BP mode includes the bit-count for the block vector(s) and the bit-count for the prediction residuals. The first distortion is calculated as the differences between the current block of input pixels and the block reconstructed pixels. The differences between the current block of input pixels and the block reconstructed pixels are caused by the quantization process of the prediction residuals. In other words, the first distortion is equivalent to the quantization errors of the prediction residuals. The distortion is often measured in terms of sum of absolute difference (SAD). However, other distortion measure may also be used.

For the BP-Skip mode, the prediction residuals are not signaled as shown in the FIG. 5D. The second bit-count associated with the BP-Skip mode includes the bit-count for the block vector(s) without the bit-count for the prediction residuals. The bit-count for the block vector(s) is also used by the BP coding tool. Therefore, the bit-count for the block vector(s) only needs to be calculated once and the result is shared by the DP coding tool and the BP-Skip coding tool. In hardware-based implementation, a common module or processing unit can be used for both the BP coding tool and the BP-Skip coding tool. The second distortion is calculated as the differences between the current block of input pixels and the block reconstructed pixels. The differences between the current block of input pixels and the block reconstructed pixels correspond to the prediction residuals. In other words, the second distortion is equivalent to the prediction residuals. If the sum of absolute difference (SAD) is used as the distortion measure, the second distortion is equal to absolution sum of the prediction residuals. Again, other distortion measure may also be used. While the BP-Skip mode does not signal the prediction residuals, the BP-Skip needs to evaluate the distortion associated with the prediction residuals as part of the cost for using the BP-Skip coding tool. However, the prediction residuals are also required for using the DP-Skip coding tool. Therefore, both the BP coding tool and the BP-Skip coding tool can share the same prediction residuals derived. In hardware based implementation, a single processing unit to derive the prediction residuals can be shared by the BP coding tool and the BP-Skip coding tool. Furthermore, a current block has to be reconstructed at the encoder side so that the reconstructed pixels can be used as prediction data for other blocks processed after the current block. For the BP mode, the current block is reconstructed summing the decoded prediction residuals after de-quantization and the predictor for the current block. For BP-Skip mode, the reconstructed current block is the same as the predictor for the current block since the prediction residuals are not signaled. In this case, the prediction residuals are treated as zero. Accordingly, the same reconstruction process for the BP mode can be used by the BP-Skip mode by setting the decoded prediction residuals to zero. Accordingly, the a single processing unit to reconstruct a block can be shared by the BP coding tool and the BP-Skip coding tool.

Figure 8:
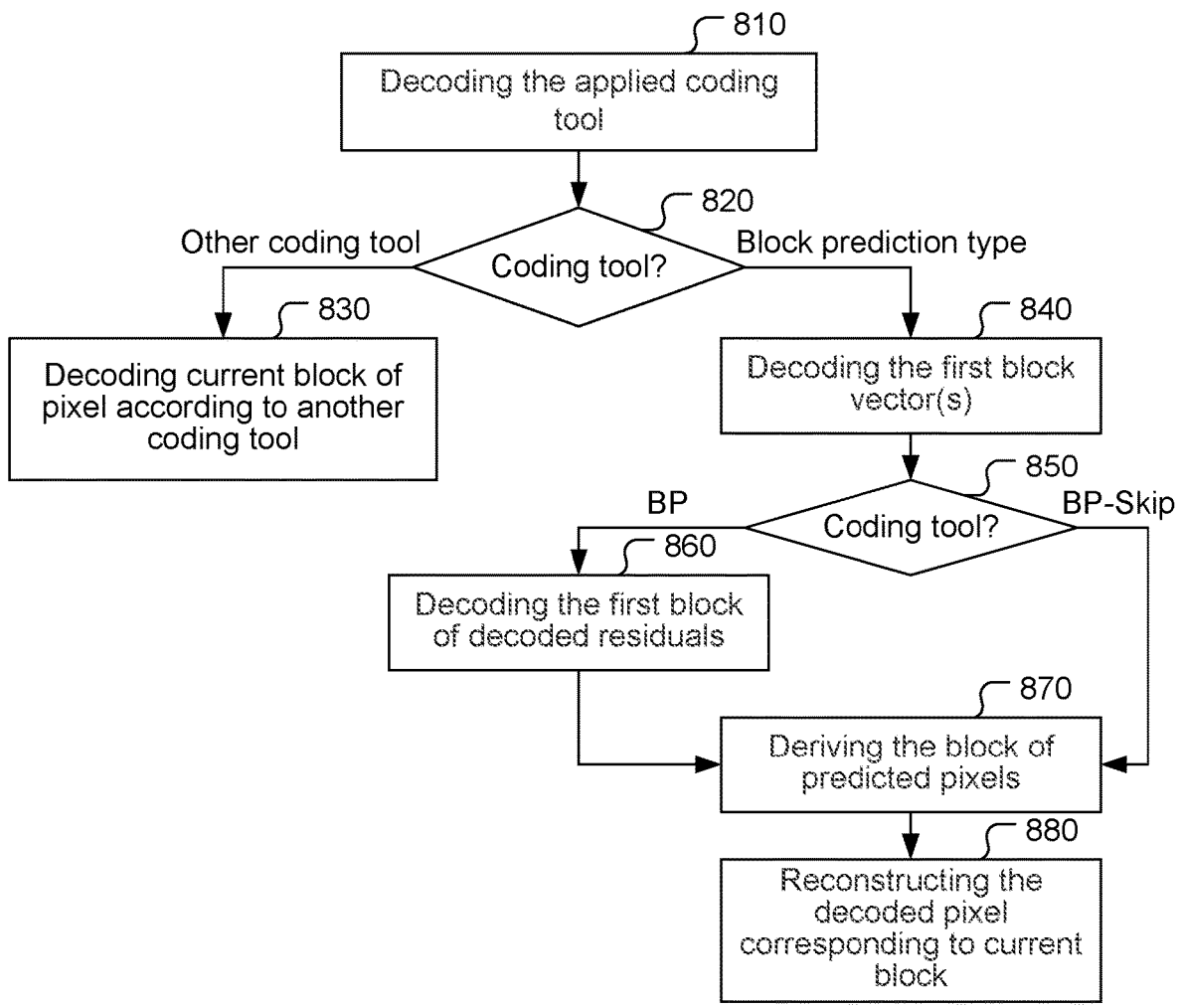
FIG. 8 illustrates an exemplary flowchart of a decoding process for a decoder including a BP mode and a BP-Skip mode according to tan embodiment of the present invention, where some processing blocks are shared.

The present invention also discloses an efficient implementation of an image decoding system that includes the BP mode and BP-Skip mode, where some processing blocks are shared between the BP mode and the BP-Skip mode. For example, both modes need to decode the compressed bitstream to determine the one or more block vectors for a block being decoded. Furthermore, both modes will use the block vector(s) derived from the bitstream to locate the predictor from the previously reconstructed pixels. Accordingly, some processing blocks can be shared between the two modes. FIG. 8 illustrates an exemplary flowchart of a decoding process for a decoder including a BP mode and a BP-Skip mode according to tan embodiment of the present invention, where some processing blocks are shared. The coding tool for a current block is decoded from the bitstream in step 810. The coding tool is checked in step 820 to determine whether it is a block prediction type or other coding tools. If another coding tool is used, the current block is decoded according to another coding tool in step 830. If the coding tool is a block prediction type, one or more block vectors (referred as the first block vector(s)) are decoded in step 840. The process further check whether the coding tool is BP mode or BP-Skip mode in step 850. If the coding tool corresponds to the BP mode, a block of decoded residuals is decoded in step 860. If the coding tool corresponds to the BP-Skip mode, no prediction residuals are decoded. A block of predicted pixels are derived in step 870, where the step is common to both BP mode and BP-Skip ode. The decoded pixel corresponding to the current block is reconstructed in step 880. Again, both BP mode and BP-Skip mode share this processing block. As mentioned before, the reconstructed block can be generated by summing the predictor and the decoded prediction residuals for the BP mode. When the same reconstruction process is used for the BP-Skip mode, the decoded prediction residuals are set to zero.

The flowchart in FIG. 8, as well as other flow charts in this disclosure, is intended as an example to implement embodiments of the present invention. The particular arrangement shall not be construed as limitations to the present invention. The present invention can also be implemented by re-arranging the processing blocks or using equivalent processing blocks with deviating from the spirit of the present invention. For example, processing step 870 for deriving a block of predicted pixels can be performed immediately after the block vectors are derived in step 840. Furthermore, while processing blocks 840, 870 and 880 are shared by the BP mode and the BP-Skip mode in the embodiment in FIG. 8, a system may also share only one or two of these processing blocks.

Figure 9:
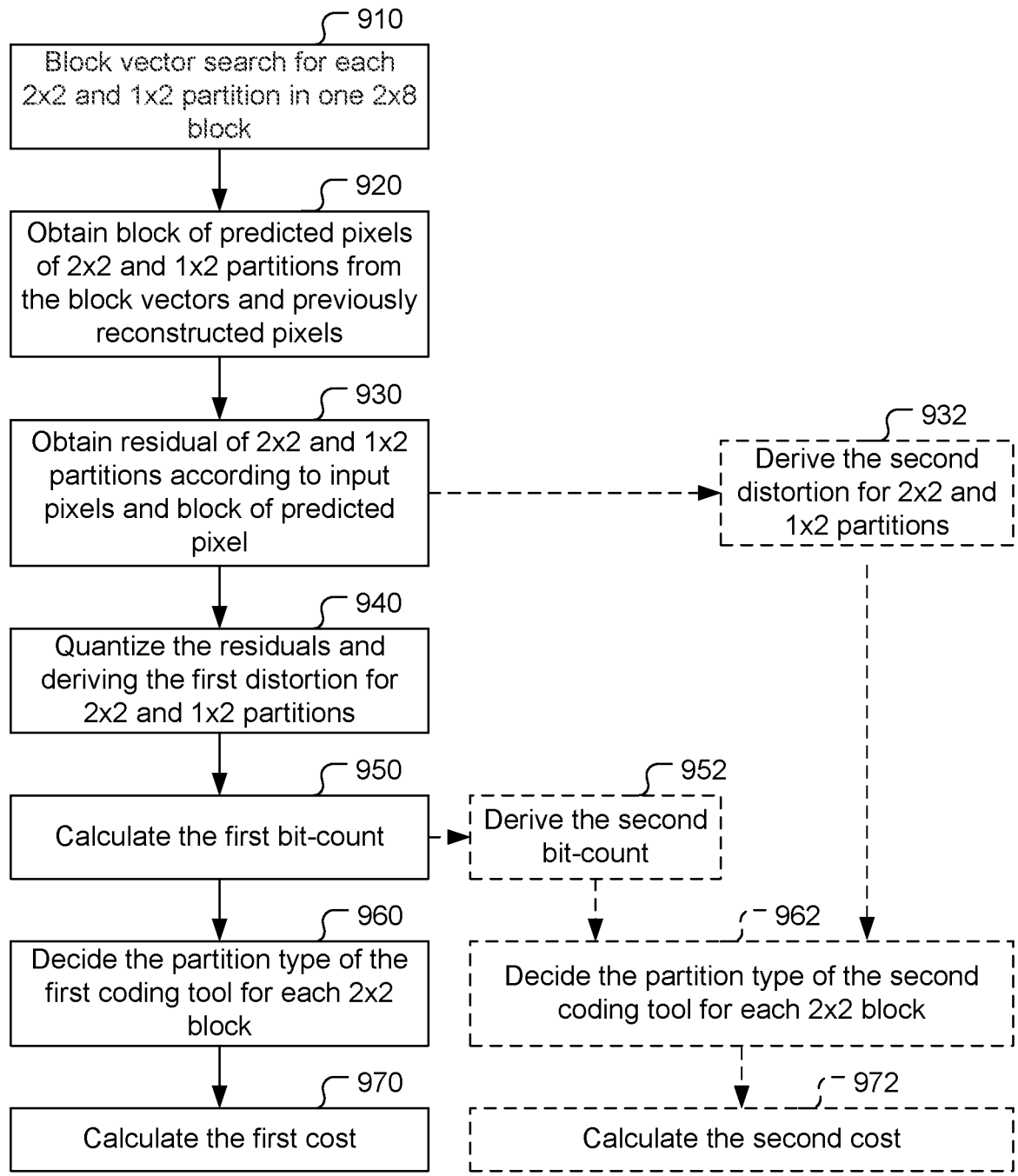
FIG. 9 illustrates another example of an image coding system using coding tools including a BP mode and a BP-Skip mode according to an embodiment of the present invention, where each 2×8 block can be partitioned using 2×2 partition or 1×2 partition, and some processing blocks are shared between the BP mode and the BP-Skip mode.

FIG. 9 illustrates another example of an image coding system using coding tools including a BP mode and a BP-Skip mode according to an embodiment of the present invention, where each 2×8 block can be partitioned using 2×2 partition or 1×2 partition, and some processing blocks are shared between the BP mode and the BP-Skip mode. The example in FIG. 9 further considers the particular block partition using in the current ADSC standard. In this case, the costs associated with two different partition types (i.e., 2×2 and 1×2 partitions) have to be calculated. Again, some processing blocks can be shared by the BP mode and the BP-Skip mode during the cost evaluation for the two partition modes. In FIG. 9, block vector search for each 2×2 and 1×2 partition in one 2×8 block is performed in step 910. Blocks of predicted pixels of 2×2 and 1×2 partitions are obtained from the block vectors and previously reconstructed pixels as shown in step 920. Furthermore, prediction residuals of 2×2 and 1×2 partitions are obtained according to input pixels and block of predicted pixel as shown in step 930. The processing blocks 910 to 930 are shared by the BP mode and the BP-Skip mode. Since BP mode and BP-Skip mode treat the prediction residuals differently, the handling of the prediction residuals will be split at this point. For the BP mode, steps 940, 950, 960 and 970 are performed. In step 940 the residuals are quantized and the distortion (referred as the first distortion) for 2×2 and 1×2 partitions is derived. In step 950, the bit-count (referred as the first bit-count) is calculated. The partition type associated with the first coding tool (i.e., BP mode) for each 2×2 block is decided in step 960 to select either the 2×2 partition or the 1×2 partition for each 2×2 block. The first cost associated with the first coding tool is determined for the 2×8 block coded with a selected partition type in step 970. As mentioned before, the first cost comprises first bit-counts for the block vectors and the coded residuals and first distortion corresponding to the quantization errors of the residuals. For the BP-Skip mode, the second dictions for the 2×2 partition and the 1×2 partition are derived. As mentioned before, the second distortion corresponds to the total residuals since the residuals are not signals. Depending on the distortion measure, the second distortion may correspond to the SAD or other measure of the residuals under the 2×2 partition or the 1×2 partition as shown in step 932, where the residuals have been derived in step 930. On the other hand, the second bit-count comprises the bit-count for the block vectors of the current block as shown in step 952, where the bit-count for the block vectors is already calculated in step 950, where bit-counts for both block vectors and coded residual are calculated for the first coding tool. No bit-count associated with the residuals is included in the second bit-count since the residuals are not signaled. In step 962, the partition type associated with the second coding tool (i.e., BP-Skip mode) for each 2×2 block is decided in step 962 to select either the 2×2 partition or the 1×2 partition for each 2×2 block. The second cost associated with the second coding tool is determined for the 2×8 block coded with a selected partition type in step 972.

Again, FIG. 9 is intended as an example to implement an embodiment of the present invention. The steps can be re-arranged or modified with equivalent processing without departing from the spirit of the present invention. For example, step 950 can be split into two steps with a first step to calculate the bit-count for the block vectors and a second step to calculate the bit-count for the coded residuals. The first step to calculate the bit-count for the block vectors can be shared by the BP mode and the BP-Skip mode. Furthermore, the first step to calculate the bit-count for the block vectors can be moved to immediately after step 910 in the flowchart. Furthermore, every processing block in blocks 910, 920 and 930 has to be shared by the BP mode and the BP-Skip ode.

The decoder processing corresponding to the encoder processing in FIG. 9 can be derived similar to the decoder flowchart in FIG. 8. In this case, the decoder will derive a partition type from the bitstream for each 2×2 block and the partition for the 2×8 block can be determined accordingly. One block vector is derived from the bitstream for each 1×2 partition and one or two motion vectors are derived from the bitstream for each 2×2 partition.

Figure 10:
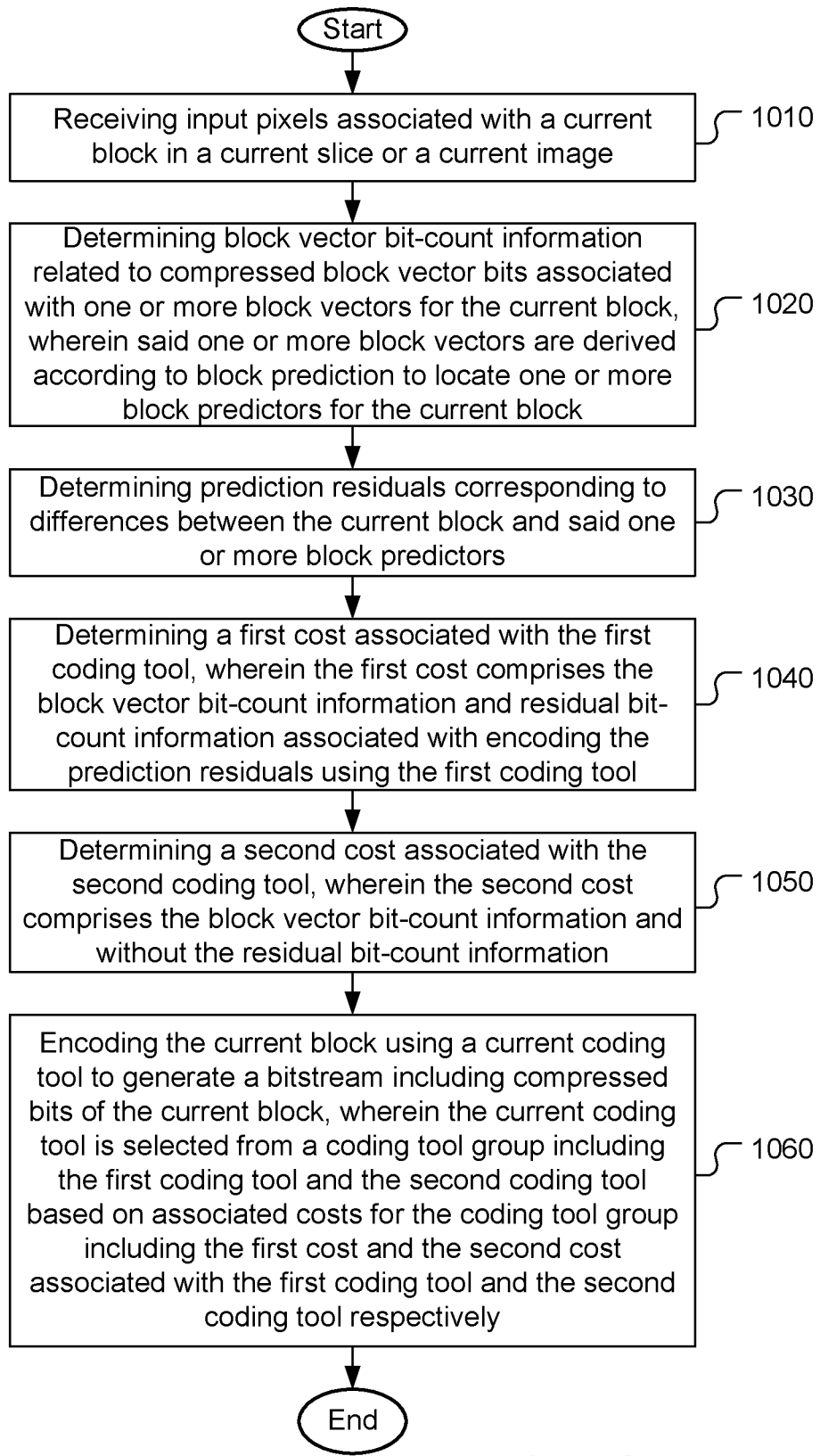
FIG. 10 illustrates an example of an image coding system using coding tools including a BP mode and a BP-Skip mode according to an embodiment of the present invention, where some processing blocks are shared between the BP mode and the BP-Skip mode.

FIG. 10 illustrates an example of an image coding system using coding tools including a BP mode and a BP-Skip mode according to an embodiment of the present invention, where some processing blocks are shared between the BP mode and the BP-Skip mode. The flowchart may correspond to software program codes to be executed on a computer, a mobile device, a digital signal processor or a programmable device for the disclosed invention. The program codes may be written in various programming languages. The flowchart may also correspond to hardware based implementation, where one or more electronic circuits (e.g. ASIC (application specific integrated circuits) and FPGA (field programmable gate array)) or processors (e.g. DSP (digital signal processor)). According to this method, input pixels associated with a current block in a current slice or a current image are received in step 1010. The block vector bit-count information related to compressed block vector bits associated with one or more block vectors for the current block are determined in step 1020, wherein said one or more block vectors are derived according to block prediction to locate one or more block predictors for the current block. Method of block vector derivation is known in the art and the details are omitted herein. Prediction residuals corresponding to differences between the current block and said one or more block predictors are determined in step 1030. A first cost associated with the first coding tool is determined in step 1040, wherein the first cost comprises the block vector bit-count information and residual bit-count information associated with encoding the prediction residuals using the first coding tool. The first coding tool may correspond to the BP mode. As mentioned before, the first cost may further comprise first distortion associated with differences between the current block and a reconstructed current block using the first coding tool. A second cost associated with the second coding tool is determined in step 1050, wherein the second cost comprises the block vector bit-count information and without the residual bit-count information. The second coding tool may correspond to the BP-Skip mode. As mentioned before, the second cost may further comprise second distortion associated with differences between the current block and a reconstructed current block using the second coding tool. The current block is then encoded using a current coding tool to generate a bitstream including compressed bits of the current block, wherein the current coding tool is selected from a coding tool group including the first coding tool and the second coding tool based on associated costs for the coding tool group including the first cost and the second cost in step 1060.

Figure 11:
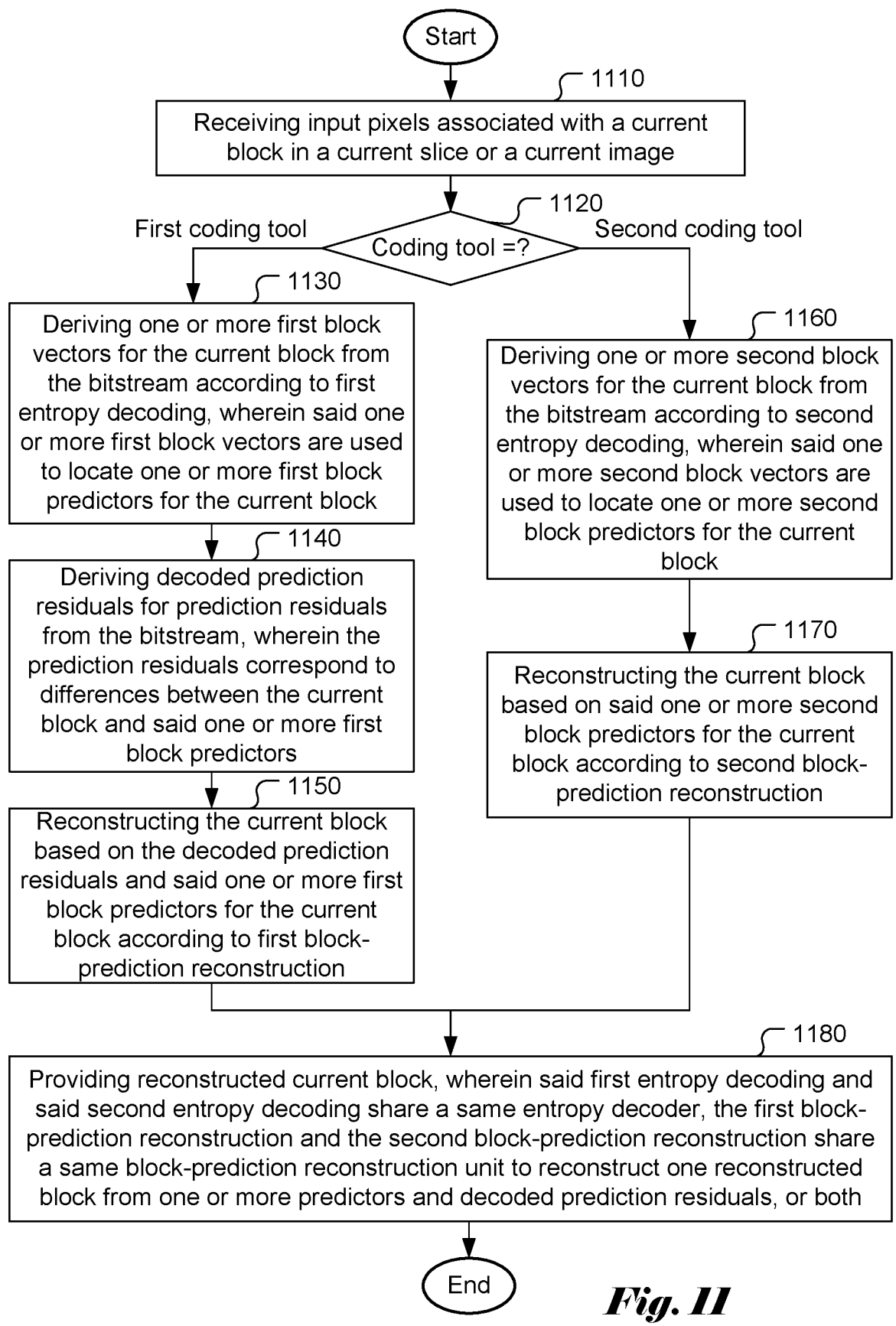
FIG. 11 illustrates another example of an image coding system using coding tools including a BP mode and a BP-Skip mode according to an embodiment of the present invention, where each 2×8 block is divided into 2×2 blocks and each 2×2 block can be coded using 2×2 partition or 1×2 partition, and some processing blocks are shared between the BP mode and the BP-Skip mode.

FIG. 11 illustrates another example of an image coding system using coding tools including a BP mode and a BP-Skip mode according to an embodiment of the present invention, where each 2×8 block can be partitioned using 2×2 partition or 1×2 partition, and some processing blocks are shared between the BP mode and the BP-Skip mode. Again, the flowchart may correspond to software program codes to be executed on a computer, a mobile device, a digital signal processor or a programmable device for the disclosed invention. The program codes may be written in various programming languages. The flowchart may also correspond to hardware based implementation, where one or more electronic circuits (e.g. ASIC (application specific integrated circuits) and FPGA (field programmable gate array)) or processors (e.g. DSP (digital signal processor)). According to this method, a bitstream including compressed bits of a current block in a current slice or a current image is received in step 1110. Whether the coding tool is the first coding tool or the second coding tool is checked at step 1120. If the first coding tool is used, steps 1130 through step 1150 are performed. If the coding tool is the second coding tool, steps 1160 and 1170 are performed. In this example, it is assumed that the coding mode is either the first coding mode (e.g., the BP mode) or the second mode (e.g., the BP-Skip mode), which corresponds to the "block prediction type" branch from step 820 in FIG. 8. For the first coding tool, one or more first block vectors for the current block are derived from the bitstream according to first entropy decoding in step 1130, wherein said one or more first block vectors are used to locate one or more first block predictors for the current block; decoded prediction residuals for prediction residuals are derived from the bitstream in step 1140, wherein the prediction residuals correspond to differences between the current block and said one or more first block predictors; and the current block is reconstructed based on the decoded prediction residuals and said one or more first block predictors for the current block according to first block-prediction reconstruction in step 1150. For the BP-Skip mode, one or more second block vectors for the current block are derived from the bitstream according to second entropy decoding in step 1160, wherein said one or more second block vectors are used to locate one or more second block predictors for the current block; and the current block is reconstructed based on said one or more second block predictors for the current block according to second block-prediction reconstruction in step 1170. In step 1180, reconstructed current block is provided, wherein said first entropy decoding and said second entropy decoding share a same entropy decoder, the first block-prediction reconstruction and the second block-prediction reconstruction share a same block-prediction reconstruction unit to reconstruct one reconstructed block from one or more predictors and decoded prediction residuals, or both.

The flowcharts shown above are intended to illustrate an example of image coding incorporating an embodiment of the present invention. A person skilled in the art may modify each step, re-arrange the steps, split a step, or combine the steps to practice the present invention without departing from the spirit of the present invention.

The flowchart may correspond to software program codes to be executed on a computer, a mobile device, a digital signal processor or a programmable device for the disclosed invention. The program codes may be written in various programming languages such as C++. The flowchart may also correspond to hardware based implementation, where one or more electronic circuits (e.g. ASIC (application specific integrated circuits) and FPGA (field programmable gate array)) or processors (e.g. DSP (digital signal processor)).

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into an image compression chip or program code integrated into image compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of image decoding for an image to be performed at a decoder, wherein the decoder uses multiple coding tools including at least a first coding tool and a second coding tool associated with block prediction, the method comprising:

receiving a bitstream including compressed bits of a current block in a current slice or a current image;

if the first coding tool is used:

deriving one or more first block vectors for the current block from the bitstream according to first entropy decoding, wherein said one or more first block vectors are used to locate one or more first block predictors for the current block;

deriving decoded prediction residuals for prediction residuals from the bitstream, wherein the prediction residuals correspond to differences between the current block and said one or more first block predictors; and reconstructing the current block based on the decoded prediction residuals and said one or more first block predictors for the current block according to first block-prediction reconstruction;

if the second coding tool is used:

deriving one or more second block vectors for the current block from the bitstream according to second entropy decoding, wherein said one or more second block vectors are used to locate one or more second block predictors for the current block; and reconstructing the current block based on said one or more second block predictors for the current block according to second block-prediction reconstruction; and providing reconstructed current block, wherein said first entropy decoding and said second entropy decoding share a same entropy decoder, the first block-prediction reconstruction and the second block-prediction reconstruction share a same block-prediction reconstruction unit to reconstruct one reconstructed block from one or more predictors and decoded prediction residuals, or both, wherein the current block corresponding to a 2×8 block is partitioned into 2×2 blocks, each 2×2 block is coded according to 2×2 partition or 1×2 partition based on a partition type derived from the bitstream, wherein one block vector is derived from the bitstream for each 1×2 block of one 2×2 block in the 1×2 partition, or one block vector is derived from the bitstream for each 2×2 block in the 2×2 partition, wherein for the 2×2 partition, one 2×2 predictor is derived from previously reconstructed pixels in the current slice or the current image according to location of each 2×2 block and said one block vector associated with each 2×2 block, and for the 1×2 partition, each 1×2 predictor of one 2×2 block is derived from previously reconstructed pixels in the current slice or the current image according to location of each 1×2 block of one 2×2 block and said one block vector associated with each 1×2 block of one 2×2 block.

2. The method of claim 1, wherein said one or more first block predictors for the current block are derived from previously reconstructed pixels in the current slice or the current image according to location of the current block and said one or more block vectors.

3. The method of claim 1, wherein when the first coding tool is used, said deriving the decoded prediction residuals comprises deriving quantized prediction residuals for the current block from the bitstream.

4. The method of claim 3, wherein when the first coding tool is used, said deriving the decoded prediction residuals further comprises applying inverse quantization to the quantized prediction residuals to recover the decoded prediction residuals.

5. The method of claim 1, wherein when the first block-prediction reconstruction and the second block-prediction reconstruction share the same block-prediction reconstruction unit, the decoded prediction residuals are set to zero for the second block-prediction reconstruction.

6. The method of claim 1, wherein when the second coding tool is used, said one or more predictors are used as a reconstructed current block.

7. An apparatus of image decoding for an image to be performed at a decoder, wherein the decoder uses multiple coding tools including at least a first coding tool and a second coding tool associated with block prediction, the apparatus comprising one or more electronic circuits or processors configured to:
receive a bitstream including compressed bits of a current block in a current slice or a current image;
if the first coding tool is used:
derive one or more first block vectors for the current block from the bitstream according to first entropy decoding, wherein said one or more first block vectors are used to locate one or more first block predictors for the current block;
derive decoded prediction residuals for prediction residuals from the bitstream, wherein the prediction residuals correspond to differences between the current block and said one or more first block predictors; and
reconstruct the current block based on the decoded prediction residuals and said one or more first block predictors for the current block according to first block-prediction reconstruction;
if the second coding tool is used:
derive one or more second block vectors for the current block from the bitstream according to second entropy decoding, wherein said one or more second block vectors are used to locate one or more second block predictors for the current block; and
reconstruct the current block based on said one or more second block predictors for the current block according to second block-prediction reconstruction; and
wherein said first entropy decoding and said second entropy decoding share a same entropy decoder, the first block-prediction reconstruction and the second block-prediction reconstruction share a same block-prediction reconstruction unit to reconstruct one reconstructed block from one or more predictors and decoded prediction residuals, or both,
wherein the current block corresponding to a 2×8 block is partitioned into 2×2 blocks, each 2×2 block is coded according to 2×2 partition or 1×2 partition based on a partition type derived from the bitstream,
wherein one block vector is derived from the bitstream for each 1×2 block of one 2×2 block in the 1×2 partition, or one block vector is derived from the bitstream for each 2×2 block in the 2×2 partition,
wherein for the 2×2 partition, one 2×2 predictor is derived from previously reconstructed pixels in the current slice or the current image according to location of each 2×2 block and said one block vector associated with each 2×2 block, and for the 1×2 partition, each 1×2 predictor of one 2×2 block is derived from previously reconstructed pixels in the current slice or the current image according to location of each 1×2 block of one 2×2 block and said one block vector associated with each 1×2 block of one 2×2 block.

8. The apparatus of claim 7, wherein the one or more electronic circuits or processors are further configured to derive said one or more first block predictors for the current block from previously reconstructed pixels in the current slice or the current image according to location of the current block and said one or more block vectors.

9. The apparatus of claim 7, wherein the one or more electronic circuits or processors are further configured to derive the decoded prediction residuals by deriving quantized prediction residuals for the current block from the bitstream when the first coding tool is used.

10. The apparatus of claim 9, wherein the one or more electronic circuits or processors are further configured to derive the decoded prediction residuals by applying inverse quantization to the quantized prediction residuals to recover the decoded prediction residuals when the first coding tool is used.

11. The apparatus of claim 7, wherein the one or more electronic circuits or processors are further configured to set to zero the decoded prediction residuals for the second block-prediction reconstruction when the first block-prediction reconstruction and the second block-prediction reconstruction share the same block-prediction reconstruction unit.

12. The apparatus of claim 7, wherein the one or more electronic circuits or processors are further configured to use said one or more predictors as a reconstructed current block when the second coding tool is used.

* * * * *